United States Patent
Tate

(10) Patent No.: US 7,069,237 B1
(45) Date of Patent: Jun. 27, 2006

(54) METHOD SYSTEM AND SOFTWARE FOR ORDERING GOODS AND/OR SERVICES OVER A COMMUNICATIONS NETWORK

(75) Inventor: William C. Tate, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 630 days.

(21) Appl. No.: 09/709,143

(22) Filed: Nov. 10, 2000

(51) Int. Cl.
*G06Q 30/00* (2006.01)

(52) U.S. Cl. .......................................... 705/26; 705/27
(58) Field of Classification Search ................. 705/26, 705/27, 28, 29; 707/104.1; 709/206, 207
See application file for complete search history.

(56) References Cited

U.S. PATENT DOCUMENTS

| | | | |
|---|---|---|---|
| 5,666,215 A | | 9/1997 | Fredlund et al. |
| 5,760,917 A | | 6/1998 | Sheridan |
| 6,009,462 A | * | 12/1999 | Birrell et al. ............... 709/206 |
| 6,017,157 A | * | 1/2000 | Garfinkle et al. ........... 396/639 |
| 6,133,985 A | | 10/2000 | Garfinkle et al. |
| 6,167,382 A | * | 12/2000 | Sparks et al. .................. 705/26 |
| 6,229,884 B1 | * | 5/2001 | Toyoda et al. ......... 379/100.08 |
| 6,321,231 B1 | * | 11/2001 | Jebens et al. ............ 707/104.1 |
| 6,388,732 B1 | * | 5/2002 | Williams et al. .............. 355/40 |
| 6,449,635 B1 | * | 9/2002 | Tilden et al. ............... 709/206 |
| 6,549,612 B1 | * | 4/2003 | Gifford et al. .............. 379/67.1 |
| 6,657,702 B1 | * | 12/2003 | Chui et al. ..................... 355/40 |
| 6,807,532 B1 | * | 10/2004 | Kolls ........................... 705/10 |

FOREIGN PATENT DOCUMENTS

| | | | |
|---|---|---|---|
| EP | 0 860 985 | * | 8/1998 |
| WO | WO 00/41120 | * | 7/2000 |

OTHER PUBLICATIONS

"New Software Offers Total Web Development Solution", PR Newswire, Dec 6, 1996.*
James Ledbetter, "Forget the Ballot Box—the GOP Wants Your Inbox", Mar. 31, 2000, The Industry Standard-The Newsmagazine of the Internet Economy.
Lee Copeland, "Breathing New Life Into Old E-Mail", Apr. 17, 2000, vol. 34, No. 16, Computerworld Inc.
Kara Swisher-contributor, "FireDrop Hopes to Radically Alter E-Mail", Mar. 13, 2000, Dow Jones & Company, Inc.—Reprinted from the Wall Street Journal.

* cited by examiner

*Primary Examiner*—Steve McAllister
*Assistant Examiner*—M. Thein
(74) *Attorney, Agent, or Firm*—Frank Pincelli

(57) ABSTRACT

A system, computer software product and a method for ordering goods and/or services with respect to digital images over a communication network. A server provided for sending e-mail to a receiving site of a customer over the communication network. The e-mail has a static section for containing static text and/or graphics and a dynamic area/section for containing dynamic data, the dynamic data is automatically forwarded to the receiving site only upon opening of the e-mail at the receiving site. The dynamic data comprising at least digital data files containing digital images. The static section contains an order section for ordering of goods and/or services with respect to said dynamic data. The order is automatically forwarded to and fulfilled by a remote service provider.

10 Claims, 10 Drawing Sheets

<Photofinisher Name> Preview & Select Remote Service

Roll: xxx     Images: nn     Processed: mm/dd/yy

Curr nt Status:   Ready for Preview and Select

| {Image 1} | {Image 2} | {Image 3} | {Image 4} | {Image 5} | {Image 6} |
|---|---|---|---|---|---|
| 1 | 2 | 3 | 4 | 5 | 6 |
| {Image 7} | {Image 8} | {Image 9} | {Image 10} | {Image 11} | {Image 12} |
| 7 | 8 | 9 | 10 | 11 | 12 |
| {Image 13} | {Image 14} | {Image 15} | {Image 16} | {Image 17} | {Image 18} |
| 13 | 14 | 15 | 16 | 17 | 18 |
| {Image 19} | {Image 20} | {Image 21} | {Image 22} | {Image 23} | {Image 24} |
| 19 | 20 | 21 | 22 | 23 | 24 |

Print Order

| Image Number | Print Size | Print Qty | Price |
|---|---|---|---|
| 1 | 4x6 | 1 | $#.00 |
| 2 | 4x6 | 2 | $#.00 |
| 1 | 5x7 | 1 | $#.00 |
| 3 | 4x6 | 1 | $#.00 |
| 4 | 4x6 | 3 | $#.00 |
| Subtotal: | | | $#.00 |
| Shipping: | | | $#.00 |
| Sales Tax: | | | $#.00 |
| TOTAL ORDER: | | | $#.00 |

[Submit]   [Modify]   [Cancel]

PERSONAL ACCOUNT INFORMATION

| Bill to: | | Ship to: | |
|---|---|---|---|
| Name: | *John Smith* | Nam : | *(same)* |
| Address: | *123 Main Street* | Address: | |
| Email Address: | *smith@email-isp.com* | | |
| T lephone Number: | *716-555-1212* | | |
| Cr dit Card #: | Type: *AMEX* | Card No: *......1023* | Exp. Date: *mm/yy* |

☐ Use Modifications for This Order Only

STATUS HISTORY

| Date | Status |
|---|---|
| *dd/mm/yy* | *Ready for Preview and Select* |
| *dd/mm/yy* | |
| *dd/mm/yy* | |
| *dd/mm/yy* | |

Note: In both Fig.3a and Fig. 3b, the text in the static section 42 is distinguished by the use of a bold, non-italic, non-underlined font. The text in the dynamic data sections 44a-44d, is distinguished by the use of a non-bold, italic, underlined font. Examples of each type are indicated by the associated arrows.

Figure 3b

METHOD SYSTEM AND SOFTWARE FOR ORDERING GOODS AND/OR SERVICES OVER A COMMUNICATIONS NETWORK

FIELD OF THE INVENTION

The present invention is directed to the ordering of goods and/or services over a communication network via e-mail and in particular the ordering of goods and/or services with respect to images having a large data file that is transmitted over a communication network.

BACKGROUND OF THE INVENTION

It is well known for individuals to order goods and/or services over a communication network, such as the Internet. It is also known that these goods and/or services may relate to images provided by a customer such as disclosed in U.S. Pat. Nos. 5,666,215; 5,760,917; and 6,017,157. The images supplied by the customer may arise from a variety of sources. One source of images is provided by the development of a roll of photographic film. As disclosed in the subject patents the images can be viewed prior to the ordering of goods and/or services with respect to such images or shared with third parties such as friends, relatives, or business associates. An example of such a system is illustrated by the Kodak Picture Preview kiosk. This service offers consumers the opportunity to customize their develop and print orders by allowing them to preview their images from the roll of film prior to having them printed. During the preview process customers can determine quantities for their entire order and/or individual pictures. They can also choose not to print the pictures that they do not want. Customers can further customize their orders by zooming and cropping the individual pictures the way that they want as well as ordering enlargements of individual pictures at the same time. As disclosed by the above U.S. patents the customer or third party may place an order over a communication network such as the Internet.

A problem with such prior art systems that use a communications network is that they are typically either browser based or dedicated applications. Typical browser-based applications are often difficult to master by individual customers. A dedicated software application may offer maximum flexibility and operation, but requires customers to install the application at their sites, which many customers are unwilling to do. A third alternative would be to create an e-mail based solution. However, while an e-mail based solution is easier to use and more familiar to many customers, it may be difficult to make it work reliably on many different platforms and environments. Additionally, e-mailed based applications with attached images may result in very large e-mails that may not be acceptable to all e-mail service providers. Such very large files may also result in difficulties such as long transmission times in transmitting the images forwarded between different platforms and may discourage customers from forwarding them to other individuals such as relatives or other third parties.

The present invention is directed to an improved system method and software application that overcomes many of the problems of the prior art.

SUMMARY OF THE INVENTION

In accordance with one aspect of the present invention there is provided a method for ordering goods and/or services with respect to digital images over a communication network, comprising:

providing a server of a first party for sending e-mail to a receiving site of a customer over the communication network, the e-mail having a static section for containing static text and/or graphics and a dynamic area/section for containing dynamic data, the dynamic data is automatically forwarded to the receiving site only upon opening of the e-mail at the receiving site, the dynamic data comprising at least digital data files containing digital images.

In accordance with another aspect of the present invention there is provided a method for ordering goods and/or services over a communication network, comprising:

providing a server of a first party for sending e-mail to a receiving site of a customer over the communication network, the e-mail having a static section for containing static text and/or graphics and a dynamic area/section for containing dynamic data, the dynamic data is automatically forwarded to the receiving site only upon opening of the e-mail at the receiving site, the static text and/or graphics containing an order section for ordering of goods and/or services with respect to the dynamic data.

In accordance with yet another aspect of the present invention there is provided a computer software product comprising a computer readable storage medium having a computer program which when loaded into a computer causes the computer to perform the following steps:

sending an e-mail from a server at a first location to a remote receiving site of a customer over a communication network, the e-mail having a static section for containing static text and/or graphics and a dynamic area/section for containing dynamic data, the dynamic data is automatically forwarded to the receiving site only upon opening of the e-mail at the receiving site, the dynamic data comprising at least digital data files containing digital images.

In accordance with another aspect of the present invention there is provided a computer software product comprising a computer readable storage medium having a computer program which when loaded into a computer causes the computer to perform the following steps:

sending an e-mail from a server at a first location to a remote receiving site of a customer over a communication network, the e-mail having a static section for containing static text and/or graphics and a dynamic area/section for containing dynamic data, the dynamic data is automatically forwarded to the receiving site only upon opening of the e-mail at the receiving site, the static text and/or graphics containing an order section for ordering of goods and/or services with respect to the dynamic data.

In still another aspect of the present invention there is provided a system for ordering goods and/or services with respect to digital images over a communication network using e-mail, comprising:

a server for sending e-mail to a computer of a customer at a remote site from the server, the e-mail having a static section for containing static text and/or graphics and a dynamic area/section for containing dynamic data, the dynamic data is automatically forwarded to the receiving site only upon opening of the e-mail at the receiving site, the static text and/or graphics containing an order section for ordering of goods and/or services with respect to the dynamic data.

a fulfillment provider for filling of the order, the e-mail having information for allowing the automatic forwarding of the order to the fulfillment provider.

In yet another aspect of the present invention there is provided a system for ordering goods and/or services with respect to digital images over a communication network using e-mail, comprising:

a retailer for receiving an image product having at least one image from a customer for the providing of goods and/or service for the customer;

a server for sending e-mail to a computer of a customer at a remote site from the server, the e-mail having a static section for containing static text and/or graphics and a dynamic area/section for containing dynamic data, the dynamic data comprising at least one digital image file of an image obtained from the image product, the dynamic data is automatically forwarded to the receiving site only upon opening of the e-mail at the receiving site, the static text and/or graphics containing an order section for ordering of the goods and/or services with respect to the dynamic data.

a fulfillment provider for filling of the order, the e-mail having information for allowing the automatic forwarding of the order to the fulfillment provider.

These and other aspects, objects, features, and advantages of the present invention will be more clearly understood and appreciated from a review of the following detailed description of the preferred embodiments and appended claims, and by reference to the accompanying drawings.

BRIEF DESCRIPTION OF THE DRAWINGS

In the detailed description of the preferred embodiments of the invention presented below, reference is made to the accompanying drawings in which:

FIGS. 3a–3b illustrates a screen display of an opened e-mail provided in accordance with the present invention.

DETAILED DESCRIPTION OF THE INVENTION

Figure 1:
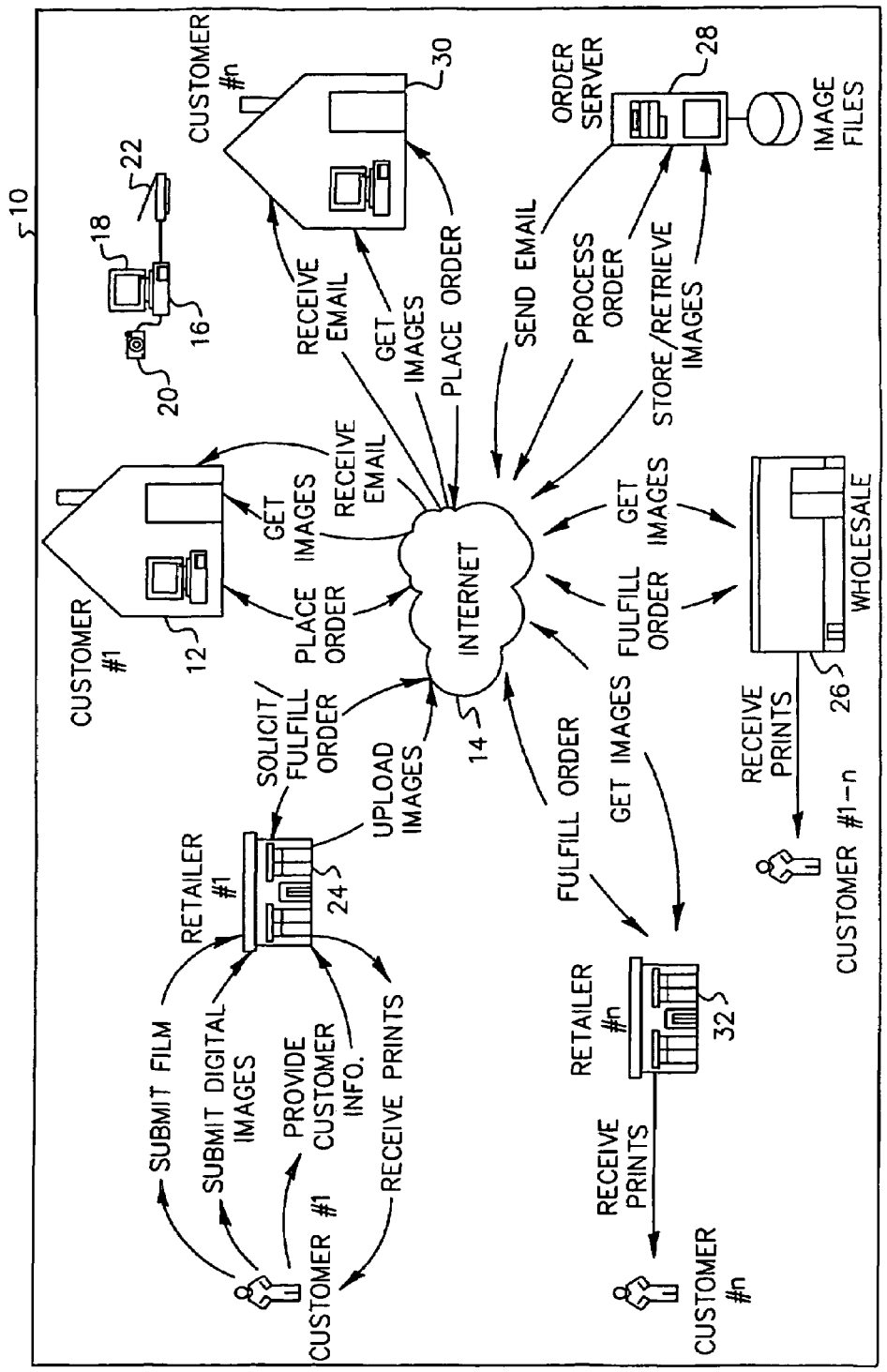
FIG. 1 illustrates a system made in accordance with the present invention.
Figure 2A:
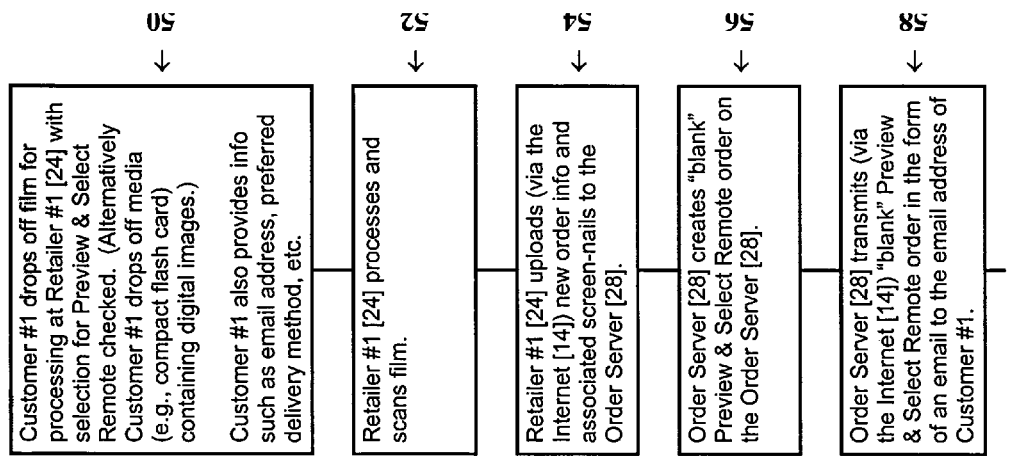
FIGS. 2a–2g illustrates a flow chart of the operation of the system of FIG. 1 in accordance with the present invention.
Figure 2B:
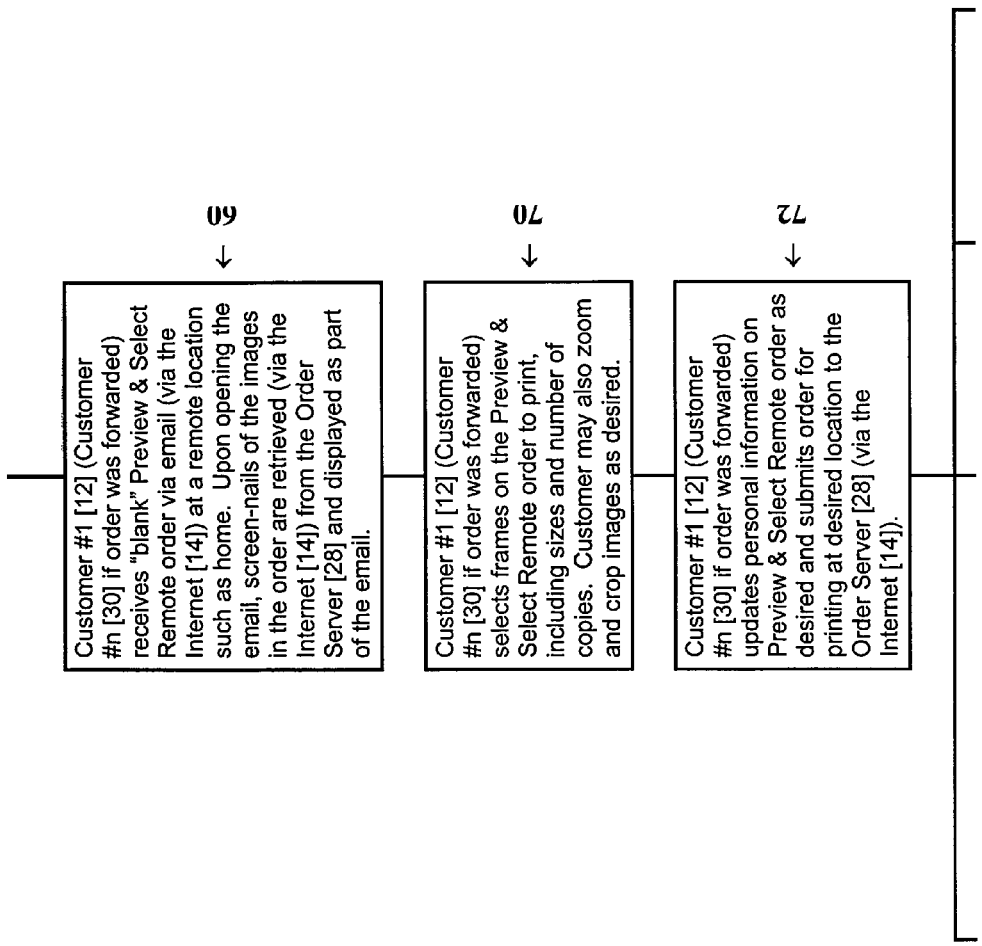
Figure 2C:
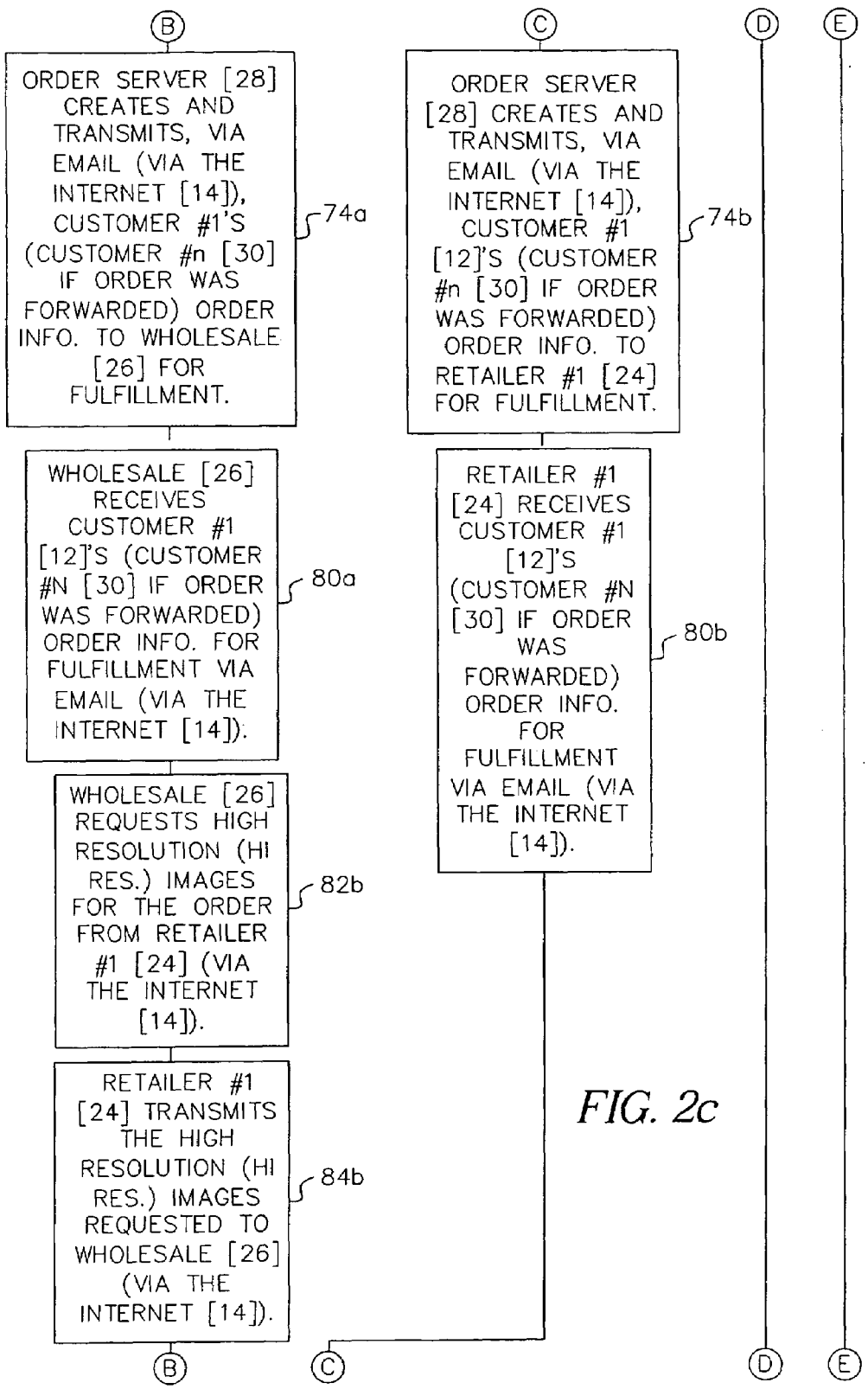
Figure 2D:
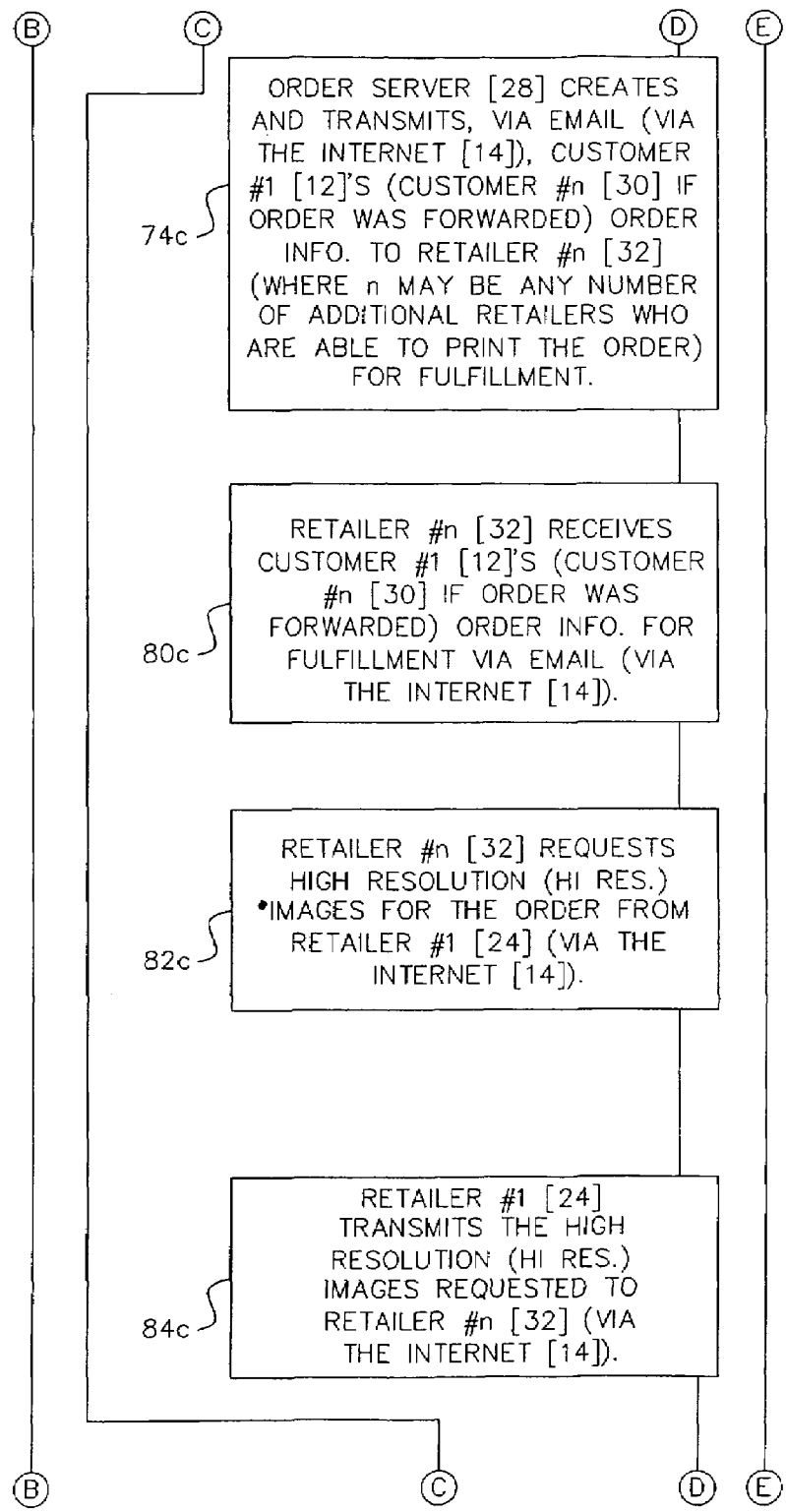
Figure 2E:
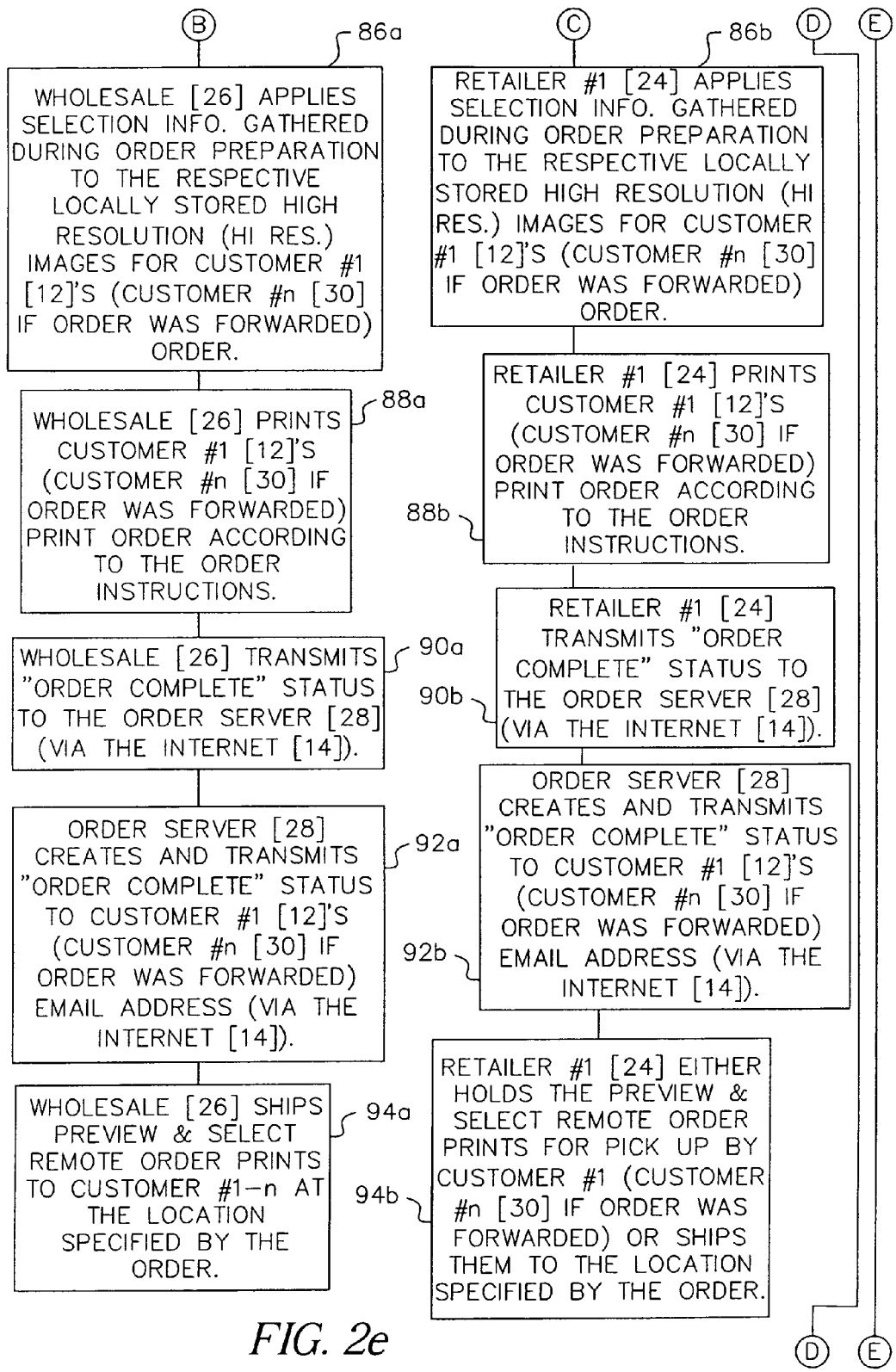
Figure 2F:
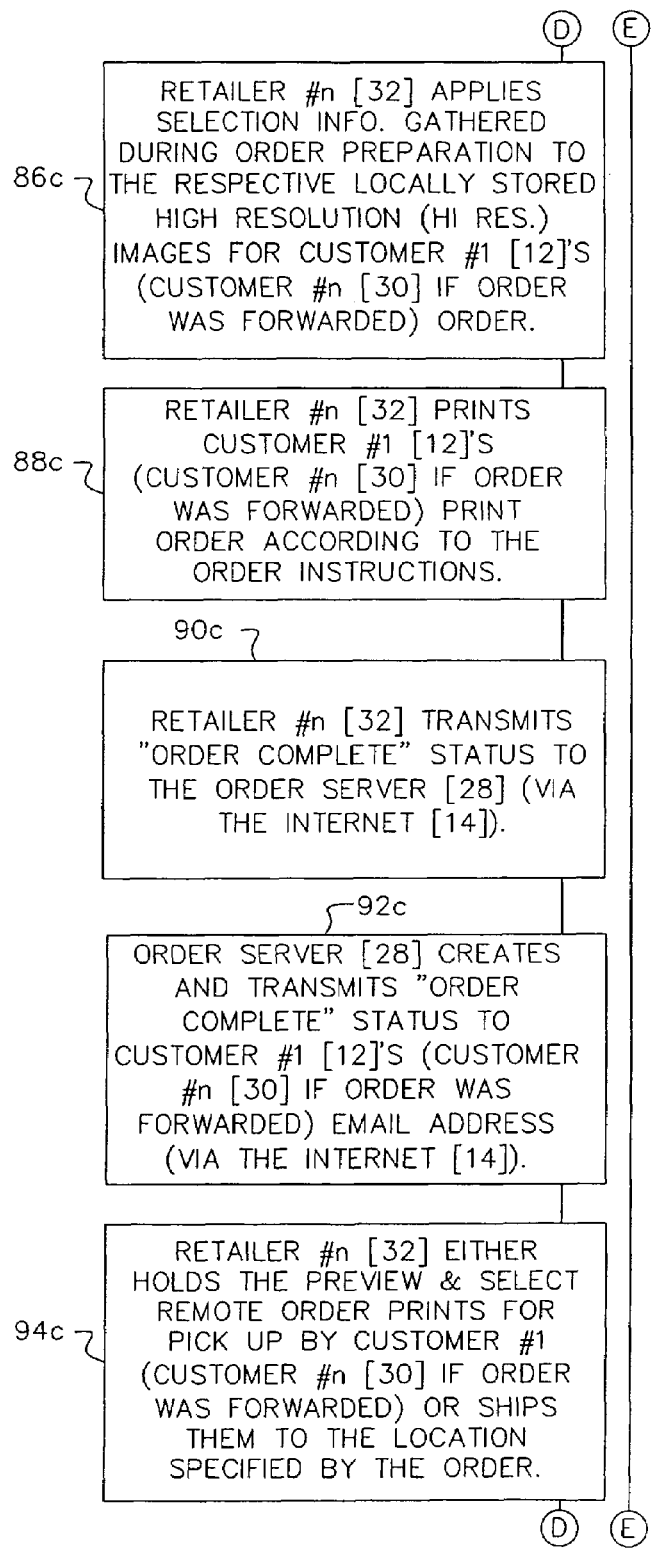
Figure 2G:
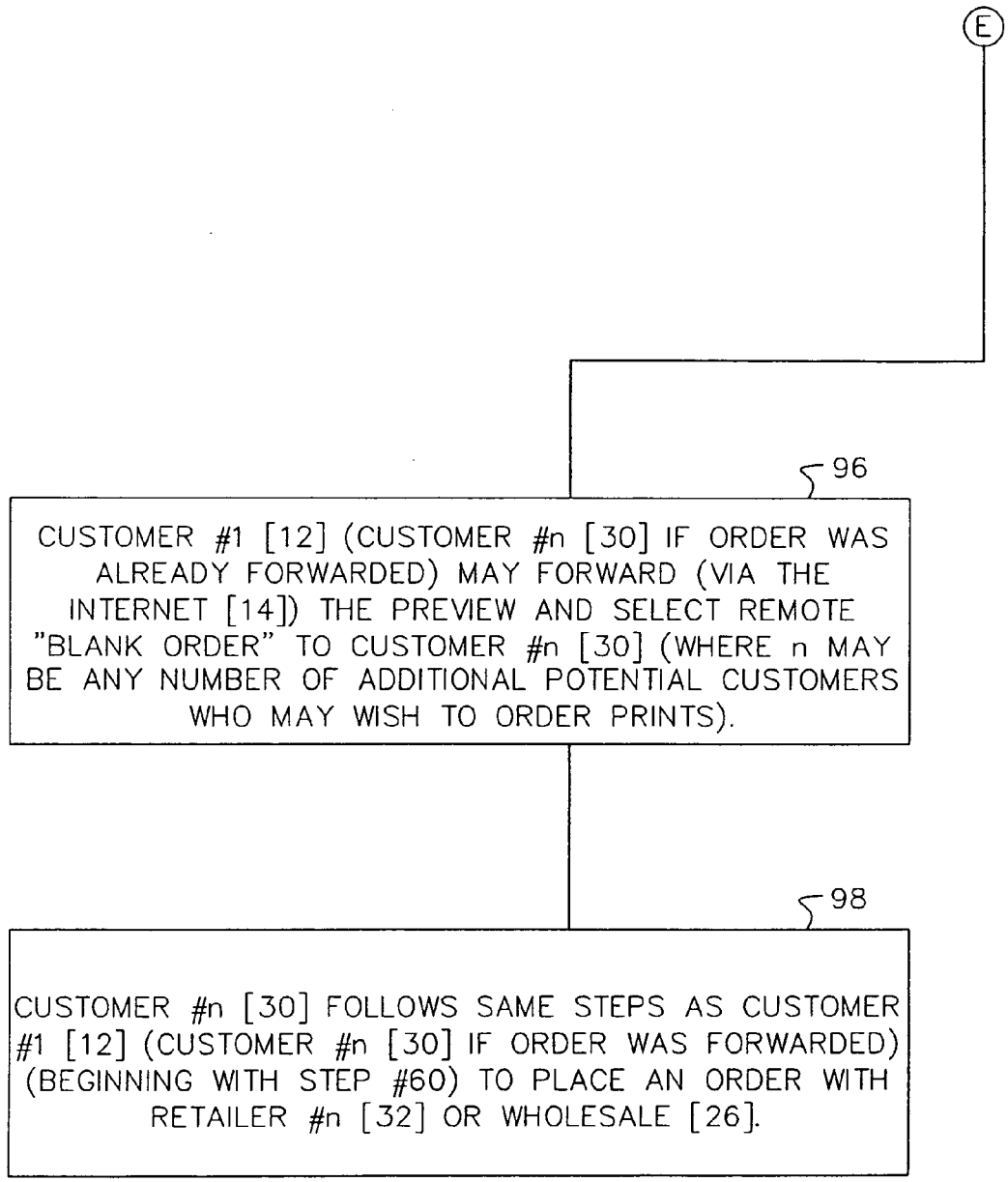

Referring to FIG. 1 there is illustrated a system 10 made in accordance with the present invention. In particular, the system 10 includes a first customer at a first location 12 having an appropriate communication device for communicating over a communication network such as the Internet 14. In the particular embodiment illustrated, the customer at location 12 has a computer 16 which includes a monitor 18 and appropriate software and hardware for allowing the computer 16 to communicate to the Internet 14. For example, over a high speed cable link or telephone line. It is to be understood that the computer 16 may be in communication with the Internet 14 by any appropriate communication means available. The customer at location 12 may also have appropriate means for capturing of digital images. For example, a digital camera 20 and/or scanner 22 which are capable of transferring the digital images so captured to computer 16 and used in any appropriate manner by the computer 16. The system 10 further includes a first retailer 24 at which a customer may submit an order for obtaining imaging products. In the particular embodiment illustrated, the customer may submit an exposed roll of photographic film to the retailer 24 for having the film developed and for the ordering of prints therefrom. The actual development and printing may occur at retailer 24 through the use of a film processor and photographic mini-lab where the film is exposed onto photographic paper and the paper developed as is well known in the art. Optionally, the exposed film may be sent to a wholesale service provider 26 wherein the film is developed and processed and later printed onto photographic paper as is also well known in the art. Both the retailer 24 and wholesale service provider 26 have appropriate computers (not shown) which allow access to the Internet 14 whereby digital image data files may be forwarded or received from third parties.

In addition to submitting exposed film, a customer may submit digital images to the retailer 24 or wholesale service provider 26 for further processing. For example, the providing of prints and/or print enlargements or any other product or service provided with respect to the images. Here again, if the customer submits the order to the retailer 24, the order can be forwarded by the retailer 24 on to the wholesale service provider 26 for completion of the order. The retailer 24 may also provide a pick-up point where the customer may pick up the goods and/or services that are either fulfilled at the retailer 24 or by the wholesale service provider 26. As illustrated by FIG. 1, the prints or other goods and/or services may be shipped directly to the customer at location 12 by the wholesale service provider 26 and/or sent to the retailer 24 for pick up by the customer.

As illustrated by FIG. 1, the customer at location 12 may communicate to the retailer 24 and/or wholesale service provider 26 as appropriate over the Internet 14. In a typical order where photographic film is being processed, the time for the processing, including the providing of the requested goods and/or services, may range from a relatively short period of time, for example, an hour, to a day or more. Quite often the customer may not be available to pick-up or review the images immediately or within the allocated time frame. Thus, providing a communication network allows the customer to review images, prior to final selection of the order, at his and/or her leisure. For example, once the film has been developed, the images can be scanned, preferably at a high-resolution, which is typically 4 Base resolution (1024× 1536) up to 16 Base resolution (2048×3072). A problem experienced by some of the prior art is that image files are usually quite large, and therefore would require excessive amounts of memory and time for receipt and transmission if sent at full resolution to the customer. In the present invention illustrated, this problem is addressed by sending low-resolution copies of the scanned images can to the customer over the communication network for review by the customer and for placement of an order for goods and/or services. For example, a customer may order a single standard print of each or some of the images that have been developed from the photographic film. The customer may elect to print only those images that are valued by the customer, thus minimizing the printing of images that are not desired. In addition, the customer may provide instructions for modifying the images received so that newly composed images may be provided in accordance with the customer's desired wishes. For example, but not limited to, the images may be cropped, color corrected, or combined with other images as desired by the customer.

The system 10 includes a server 28, typically a computer, having appropriate memory and software, that is in communication with the Internet 14. Low-resolution versions of the images are first forwarded over the Internet 14 to server 28 by the retailer 24. It is to be understood that any number of customers may be linked to the Internet 14 and accordingly to numerous retailers and wholesale fulfillment service providers that are similar or identical to the retailer 24 and wholesale service provider 26 previously described. For example, in the particular embodiment illustrated, a plurality of other customers may be located at different locations 30 which have similar type setups as the customer at location 12. Likewise, a plurality of other retailers 32 may operate at different locations in the same manner as retailer 24. While not illustrated, any desired number of wholesale service providers 26 may likewise be provided.

A software program resides in server 28 which causes the server 28 to perform specific actions. In the particular embodiment illustrated, the computer software program produces an e-mail for forwarding to the customer so that the customer can preview the images that have been developed prior to actual fulfillment of an order by the customer. The e-mail is produced in such a manner so as to comprise a static section and dynamic data areas/sections. Referring to FIGS. 3*a*–3*b* there is illustrated a screen display 40 illustrating static section 42 and dynamic data areas/sections 44*a*–44*d*. The static section 42 comprises text and/or graphic information which provides a general background screen that is common to different customers. In FIGS. 3*a*–3*b*, its text is distinguished from the dynamic data areas/sections by the use of a bold, non-italic font. The dynamic data areas/sections 44*a*–44*d* provide locations where customer images, order information, customer information, and order status will be displayed. In FIGS. 3*a*–3*b*, its text is distinguished from the static section by the use of a non-bold, italic, underlined font. When the e-mail is sent to the customer by the server 28, data is not contained directly in the dynamic data areas/sections. Instead hotlinks (pointers not shown) are provided indicating where the images and other information are located in the server 28. When the customer is on-line to the Internet 14 and the e-mail is opened, the hotlinks are followed automatically by the customer computer to access the server 28. The server 28 recognizes an appropriate ID also included in the sent e-mail as authorization to automatically transmit the appropriate images and other information to display in the dynamic areas/sections 44*a*–44*d*. The image data hotlinks point only to low-resolution images that are used for display purposes only. Corresponding high-resolution images are stored at the retailer 24 and associated with the customer order. It is typically the high-resolution images that are ultimately used for the fulfillment of the customer order. However, if remote fulfillment is desired, the high-resolution images are also forwarded over the Internet 14 to the server 28. These high-resolution images will be forwarded only to the appropriate retailer 32 or wholesale service provider 26 when needed to print the order. Thus, when the customer simply opens an e-mail which includes images, the actual e-mail contains relatively small amounts of data because relatively small amounts of information have been transmitted to the customer at location 12. The hotlinks are automatically followed behind the scenes providing direct access to the display images stored at the server 28. In an alternate form of the present invention, low-resolution digital images will be sent with the e-mail for placement in the dynamic data areas/sections 44*a*–44*d* to allow the customer to prepare an order without having to be connected to the Internet 14 continuously. An example of software that may be used in the system to display images according to the present invention is currently offered by FireDrop, Inc.

In the embodiment illustrated by FIGS. 3*a*–3*b*, the single static section 42 contains 4 different areas to receive different types of dynamic data. At the top of the static section 42 in FIG. 3*a*, an image area is provided in the dynamic area/section 44*a* with up to 24 slots or holes, each slot designed to receive a single low-resolution digital image from the server 28. When the customer wishes to view a particular image in greater detail, the customer would select the desired image, for example by placing the cursor over the image and clicking on the image. This results in getting more information with respect to the image, including but not limited to, a larger view of the image. A major benefit of the present invention is that the high-resolution images are not transmitted with the original e-mail which allows the customer to open the e-mail and to view the image quickly. The present invention also allows customers to share images and comments. Additional information, for example, but not limited to, comments with respect to the image, may be added so that when viewed again by the customer or by other parties, this information can be viewed and shared. It also allows the images to be updated by other individuals who may make improvements or additions so that when the customer revisits the site where this image is located, any modifications, changes, and/or additional images may be viewed and shared.

Below the dynamic image data area/section 44*a* in the static section 42 in FIG. 3*a* is a second dynamic area 44*b* which is designed to receive the details of the order being created by the customer, including quantity and sizes of prints desired. Initially, this dynamic order area/section 44*b* is empty. As the customer selects prints to order, each selection is represented by one or more lines of order data in the dynamic order area/section 44*b*. A running total of the charges for the order is also included at the bottom of the dynamic order area/section 44*b*. This dynamic data is also transmitted to the server 28 so that it may be available for subsequent order fulfillment.

Below the dynamic image data area/section 44*b* in the static section 42 is a third dynamic area/section 44*c* which is illustrated in FIG. 3*b*. It is designed to display the status history of the order, including its present state. In this embodiment, as the order passes through the fulfillment process, additional status lines are created and stored on the server 28. They are also displayed in this dynamic data area. When the e-mail is subsequently viewed again by the customer, the current status history of the order will be displayed for review and possible action.

Below the dynamic image data area/section 44*c* in the static section 42 is a fourth dynamic area/section 44*d*. It is designed to display the customer's current personal and account information that is stored on the server 28. The customer may elect at any time to change the information in this dynamic area/section. For example, but not limited to, the customer may change the location where the order will be fulfilled, whether the order is to be picked up or shipped to the customer, and the customer's credit card information. The customer may elect to change this information for the current order only or make it the new information for subsequent orders. When the e-mail is subsequently viewed again by the customer, the information used for this order will be displayed for review.

In order to better understand the present invention, reference is made to FIGS. 2*a*–2*e*, which illustrate a workflow diagram of the operation of the present invention. In particular, the first step taken by a customer is illustrated by box 50 where a first customer drops off film (or other images) for processing at retailer 24. The customer would request the preview and select feature so that the image will be forwarded to the customer for review prior to ordering and/or fulfillment of an order for goods and/or services. While in the particular embodiment illustrated, the film is dropped off as previously discussed, other image bearing media, such as a flash card or other electronic memory device can be dropped off, or forwarded electronically to the retailer. Other customer information is provided to the retailer such as the e-mail address of the customer, desired delivery method, and any other appropriate information.

At step 52, the images are processed. For example, if photographic film has been dropped off, the film will be developed and scanned digitally at a high-resolution. Alternatively, as previously discussed, the images may be sent to a wholesale service provider 26 for the developing and scanning of the film.

At step 54, the retailer and/or wholesale service provider would then upload the scanned low-resolution digital images to the server 28. In the embodiment illustrated this is done over the Internet 14. The high-resolution images are stored at the retailer 24 or the wholesale service provider 26. In the particular embodiment illustrated, as previously discussed, the server 28 is illustrated as being located at a location different from the wholesale service provider 26 or retailer 24. However, it is to be understood that the server 28 may be provided at the retailer 24 and/or wholesale service provider 26 as desired. The order server 28 is programmed to generate an e-mail at step 56, having a static section 42 and dynamic areas/sections 44a–44d as previously discussed. At step 58, the server sends the generated e-mail to the appropriate customer. For example, if a customer has provided the film for development at the retailer, the server 28 would send an e-mail to the electronic address provided by the customer. As set forth by step 60, as the e-mail is opened, it will automatically access the server 28 and pull up the appropriate dynamic areas/sections 44a–44d using the hot links contained in the e-mail. The customer then previews the images displayed. At step 70, the appropriate image manipulation and ordering takes place. The customer makes appropriate selections and/or adjustments to the images provided by the e-mail to create the order. For example, but not limited to, ordering of prints, other products such as T-shirts, mugs with images, and including any image corrections or manipulations that may be desired. It is of course understood that any appropriate product selection may be offered to the customer. For example, but not limited to, album pages, enlargements etc.

At step 72, the information for any order that has been selected by the customer in step 70, is forwarded to the location specified in the e-mail where the order is to be fulfilled. In the embodiment illustrated, the original e-mail will contain a URL (universal resource locator) that will be used to automatically transmit the order to the location where it is to be fulfilled. For example, the order may be sent to retailer 24 or wholesale service provider 26. Alternatively the order may be sent to the server 28 where the server will then forward it to the appropriate fulfillment location. At steps 74a, 74b, and 74c the order can be sent to one of several locations. In step 74a the order can be sent to a wholesale service provider 26, at step 74b the order can be sent to the original retailer 24, or at step 74c the order can be sent to another retailer 32 located at a convenient location for the customer to receive the order. With respect to step 74c, this step may be relevant when sending orders back home or to relatives located at a different place so that the images can be picked up by the customer or a third party conveniently at a retailer 32 close to the person that will receive the image order. As indicated by steps 80a, 80b, and 80c, the appropriate order is received by the wholesale service provider 26 or appropriate retailer 24 or 32. At steps 82b and 82c the wholesale service provider and retailer are not the location at which the original images were provided. Thus, copies of the appropriate high-resolution images may need to be transmitted via the Internet 14 from their current location to the appropriate location for fulfillment. In the particular embodiment illustrated, retailer number one already has the high-resolution images, therefore, there is no need for obtaining the high-resolution images. In steps 84b and 84c, the actual high-resolution images are transmitted from the location from which they are stored to the appropriate location where they are to be fulfilled. In steps 86a, 86b, and 86c the order details and the referenced high-resolution images are correctly associated and are prepared for creation of the appropriate goods and/or service. For example, the imaging devices are programmed to provide the appropriate number of prints and/or goods requested. At steps 88a, 88b, and 88c, the orders are appropriately filled in accordance with the customer's instructions. At steps 90a, 90b, and 90c, respectfully the appropriate locations at which the orders can be produced, the order is completed and a transmission is provided to the customer that the order has been completed. The next steps 92a, 92b, and 92c respectively, for each of the subject paths, the server creates and transmits a notice that the order has been completed.

In step 94a when the wholesale service provider has completed the order, the order is shipped, for example, by mail, directly to the customer. Whereas in steps 94b and 94c, where a retailer has completed the order, the retailer may hold the order for pick-up by the customer/recipient. Alternately, if desired by the customer or retailer, the order can be forwarded to the customer by any appropriate shipping method.

Going back to step 72, the customer can alternately forward the previewed images and information including where the images are being stored to a third party at step 96. Forwarding can be done by any appropriate communication network, for example, the Internet 14.

As previously noted, the server may be located independently of the retailers or can be located at any of the retailers or wholesale service providers which form a part of the system 10 herein. Thus, a customer does not necessarily need to have all the images at a particular retailer or wholesale service provider. As long as the images have appropriate identified information, they can be stored on any server accessible via the Internet 14.

An important aspect of the present invention is that when the customer receives notice that the processed images are ready, it is in the form of an e-mail. The e-mail having a general background screen and having blank spaces in which images and other information are to be displayed. This data is not forwarded to the customer until the e-mail is actually opened, at which time, the e-mail will follow hot links that point to the location where the images and other information are stored. The images and the current customer and order information are then downloaded immediately for display to the recipient. As an added feature to the present invention, since the images are located at a server and may be accessed by a variety of different parties, various people may be allowed to add or make modifications and to add comments to the image file. Thus, when a recipient receives an e-mail, there is the ability to modify the images and/or add more images to the collection. Thus, images can be shared very effectively and easily. Further, since the images are not accessed until the e-mail is opened, messages can be sent very quickly and easily. When high-resolution images are needed for remote fulfillment, they must be transmitted to the location where in which they will be fulfillment will take place. To make this process as easy and inexpensive as possible, the images can be transmitted at times that are convenient for the sender and recipient.

It is to be understood that various modifications and changes may be made without parting from the present invention. The present invention being defined by the following claims.

PARTS LIST

10. System
12. Location
14. The Internet
16. Computer
18. Monitor
20. Digital camera
22. Scanner
24. Retailer
26. Provider
28. Server
30. Locations
32. Retailers
40. Display
42. Section
44a. Dynamic data area/section
44b. Dynamic data area/section
44c. Dynamic data area/section
44d. Dynamic data area/section
50. Box
52. Step
54. Step
56. Step
58. Step
60. Step
70. Step
72. Step
74a. Step
74b. Step
74c. Step
80a. Step
80b. Step
80c. Step
82b. Step
82c. Step
84b. Step
84c. Step
86a. Step
86b. Step
86c. Step
88a. Step
88b. Step
88c. Step
90a. Step
90b. Step
90c. Step
92a. Step
92b. Step
92c. Step
94a. Step
94b. Step
94c. Step
96. Step
98. Step

What is claimed is:

1. A method for ordering goods or services over a communication network, comprising:
providing a server of a first party for sending e-mail to a receiving site of a customer over the communication network, said server having a low resolution digital image file including at least one digital image, said e-mail having a static section for containing static text and graphics including an order section, and a dynamic area/section for containing dynamic data including said low-resolution digital image file;
automatically forwarding said dynamic data by said server to said receiving site only upon opening of said e-mail at said receiving site;
creating an order for goods or services at said receiving site using said order section by selecting the at least one digital image; and
automatically sending said order to a second part upon placement of said order by using a URL address of the second party included in said e-mail.

2. A method according to claim 1 when said URL address of said second party is different from the URL address of said first party.

3. A method according to claim 2 wherein said second party will fulfill said order placed by said customer.

4. A method according to claim 3 wherein a portion of the money paid by said customer to said second party is allocated to said first party.

5. A method according to claim 4 wherein said portion of the money paid to said second party is forwarded to said first party upon or after receipt of payment by said customer to said second party.

6. A method according to claim 2 wherein a notice is send to said first party by said second party when said order is placed with said second party.

7. A method according to claim 1 wherein said e-mail includes the ability for the customer to send an e-mail to a third party for allowing access to said images at said server and for placement of an order by said third party.

8. A method according to claim 7 wherein said customer further permits said third party to provide additional data to said images.

9. A method according to claim 1 wherein said server allows sad third party to provide data to said dynamic data.

10. A method according to claim 1 wherein said communication network comprises the Internet.

* * * * *

UNITED STATES PATENT AND TRADEMARK OFFICE
CERTIFICATE OF CORRECTION

PATENT NO.         : 7,069,237 B1                                        Page 1 of 1
APPLICATION NO. : 09/709143
DATED              : June 27, 2006
INVENTOR(S)        : William C. Tate It is certified that error appears in the above-identified patent and that said Letters Patent is hereby corrected as shown below:

Column 10, Claim 6, line 37, "send" should read --sent--
Column 10, Claim 9, line 48, "sad" should read --said--

Signed and Sealed this

Twenty-sixth Day of December, 2006

JON W. DUDAS
*Director of the United States Patent and Trademark Office*